United States Patent
Shimazaki

(10) Patent No.: US 8,553,252 B2
(45) Date of Patent: Oct. 8, 2013

(54) COMMUNICATION APPARATUS, PRINTING APPARATUS, PRINTING SYSTEM INCLUDING SAID COMMUNICATION APPARATUS AND PRINTING APPARATUS, AND METHOD OF CONTROLLING SAME

(75) Inventor: Atsushi Shimazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1353 days.

(21) Appl. No.: 11/610,229

(22) Filed: Dec. 13, 2006

(65) Prior Publication Data

US 2007/0153323 A1    Jul. 5, 2007

(30) Foreign Application Priority Data

Jan. 5, 2006    (JP) .................. 2006-000789

(51) Int. Cl.
*G06F 15/00*    (2006.01)

(52) U.S. Cl.
USPC . 358/1.15; 358/1.13; 358/1.14; 707/999.003; 709/227; 715/234

(58) Field of Classification Search
USPC ...................... 358/1.15, 1.13, 1.14
See application file for complete search history.

(56) References Cited

U.S. PATENT DOCUMENTS

| | | | | |
|---|---|---|---|---|
| 6,934,044 | B1 * | 8/2005 | Khandelwal | 358/1.15 |
| 2003/0005001 | A1 * | 1/2003 | Kataoka | 707/513 |
| 2004/0218209 | A1 * | 11/2004 | Hamaguchi et al. | 358/1.15 |
| 2004/0249956 | A1 * | 12/2004 | Tanimoto | 709/227 |
| 2005/0262049 | A1 * | 11/2005 | Somppi | 707/3 |

FOREIGN PATENT DOCUMENTS

JP    2004-303194 A    10/2004

OTHER PUBLICATIONS

Machine translation of Japanese Patent Document No. 2004-303194, Masakatsu et al., Oct. 28, 2004.*

* cited by examiner

*Primary Examiner* — Thomas D Lee
*Assistant Examiner* — Mark Milia
(74) *Attorney, Agent, or Firm* — Fitzpatrick, Cella, Harper & Scinto

(57) ABSTRACT

In response to a search command issued from a communication terminal, a printing apparatus declares to the communication terminal that the printing apparatus possesses an analyzing function for analyzing information described in a structured language. The printing apparatus analyzes description data, which relates to a communication method described in a structured language transmitted from the communication terminal, and communicates with the communication terminal in accordance with the communication method.

19 Claims, 11 Drawing Sheets

FIG. 1
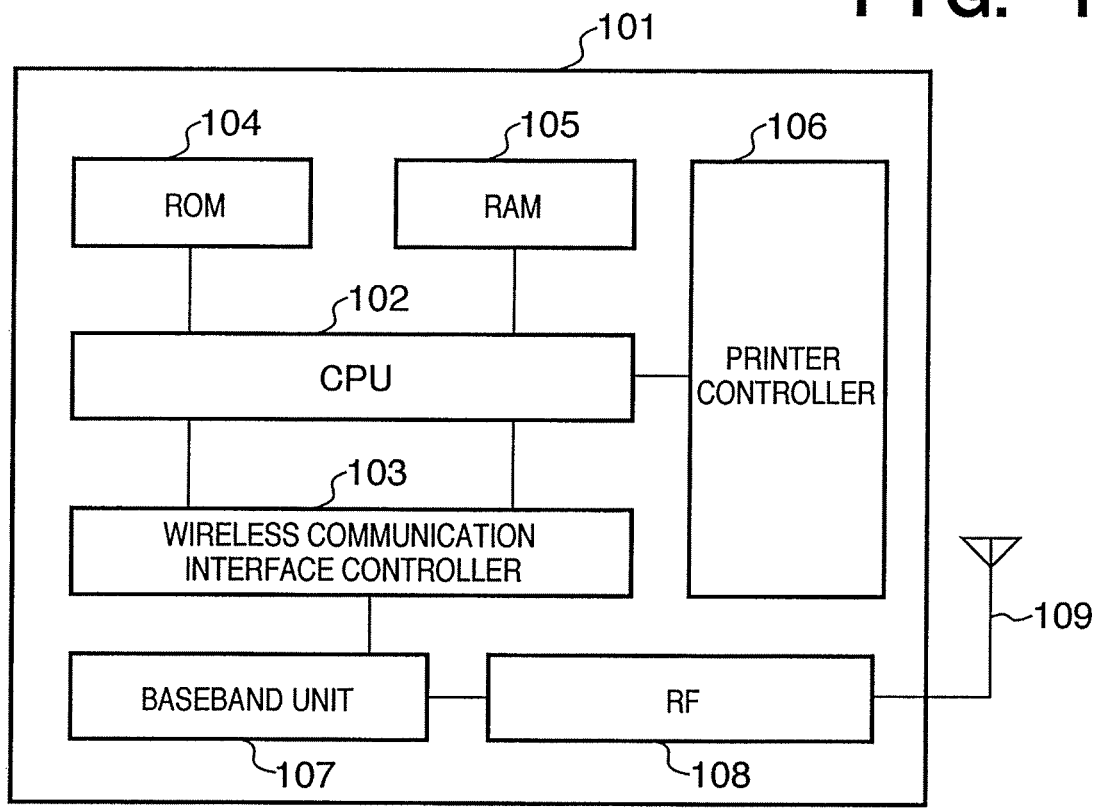
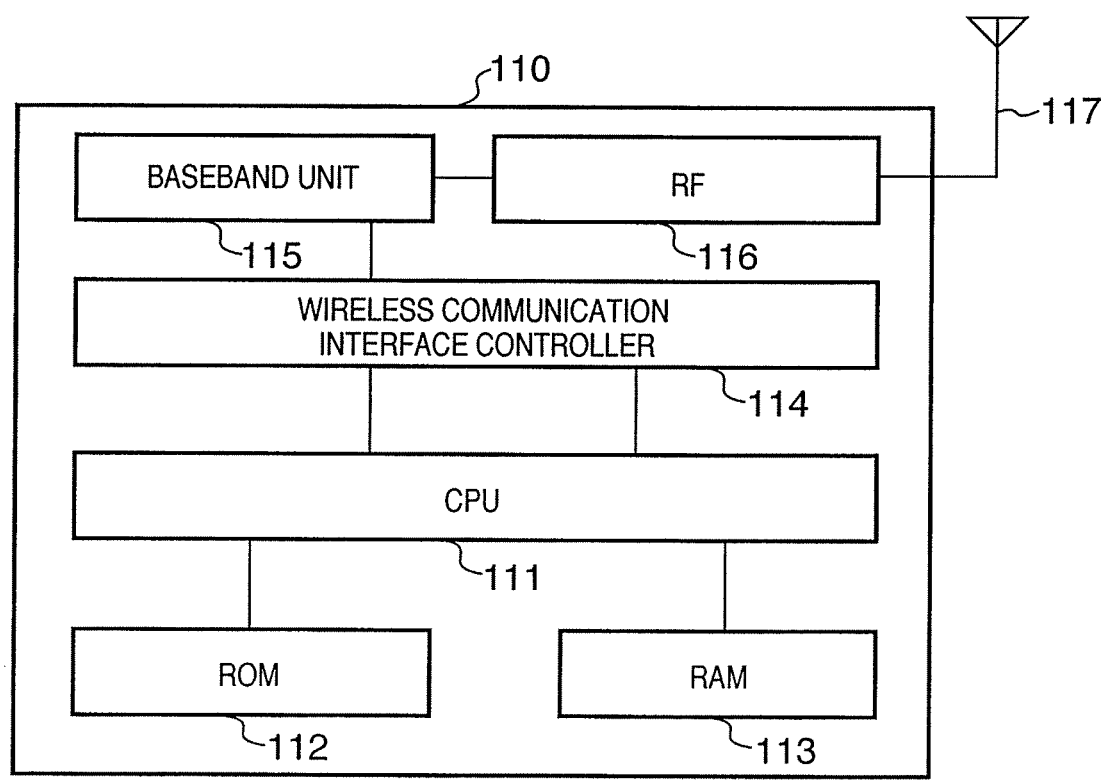

FIG. 3

EXAMPLE OF 1284ID

MFG : Ganon ;
CMD : GanonRaster1, Text ;
MDL : iPXX ;
CLS : PRINTER ;
DES : Ganon iPXX ;
VER : 1.00 ;
EXT : XML10 ;

XML INTERPRETATION DECLARATION

EXAMPLE OF DEVICENAME

XXX Inc Model YYY EXT : XML10

FIG. 4

EXAMPLE OF DECLARATION OF USE OF DESCRIPTION HEADER

```
<?xml version="1.0" ?>
<Declaration xmlns : bt-ext='http://xxx.com/BT/service'
    <bt-ext : UsedHeader>
        OBEX : Description : 05          ~400
    </bt-ext : UsedHeader>
</Declaration>
```

EXAMPLE OF ACK OF USE OF DESCRIPTION HEADER

```
<?xml version="1.0" ?>
<Declaration xmlns : bt-ext='http://xxx.com/BT/service'
    <bt-ext : UsedHeaderResponse>
        ACK : 00     ~401
    </bt-ext : Response>
</Declaration>
```

FIG. 7

EXAMPLE OF DESCRIPTION OF STATUS RESPONSE BASED UPON DESCRIPTION HEADER

```
<?xml version="1.0" ?>
<Event xmlns : ganon-IJ=' http://ganon. jp/IJ/service'
        xmlns : iPXX=' http://ganon. jp/IJ/iPXX/service'
    <ganon-IJ : Status>
        Warning : Ink empty : Cyan    ~700
    </ganon-IJ : Status>
    <iPXX : Status>
        WS : C=5 ;   ~701
    </iPXX : Status>
</Event>
```

FIG. 9

EXAMPLE OF DESCRIPTION OF ORIGINALLY DEFINED STATUS RESPONSE BASED UPON SOAP

```
<s : Envelope xmlns : s="http://schemas.xmlsoap.org/soap/envelope/"
             s : encodingStyle="http://schemas.xmlsoap.org/soap/encoding/">
  <s : Body>
    <u : GetEventResponse xmlns : u="urn : schemas-bluetooth-org : service : Printer : 1">
      <JobId>12345</JobId>
      <JobState>stopped</JobState>
      <PrinterState>stopped</PrinterState>
      <PrinterStateReasons>marker-supply-empty</PrinterStateReasons>
      <OperationStatus>0x0000</OperationStatus>
    </u : GetEventResponse>
    <ganon-IJ : Status xmlns : ganon-IJ= http://ganon. jp/IJ/service' >
      Warning : Ink empty : Cyan
    </ganon-IJ : Status>
    <iPXX : Status xmlns : iPXX=' http://ganon. jp/IJ/iPXX/service' >
      WS : C=5 ;
    </iPXX : Status>                                                    ~900
  </s : Body>
</s : Envelope>
```

COMMUNICATION APPARATUS, PRINTING APPARATUS, PRINTING SYSTEM INCLUDING SAID COMMUNICATION APPARATUS AND PRINTING APPARATUS, AND METHOD OF CONTROLLING SAME

BACKGROUND OF THE INVENTION

1. Field of the Invention

The present invention relates to a communication apparatus, a printing apparatus, a printing system that includes the communication apparatus and printing apparatus, and methods of controlling the communication apparatus and printing apparatus.

2. Description of the Related Art

Direct printing, in which a printer is caused to print image data upon transmitting the image data to the printer from various mobile devices typified by cellular phones and digital cameras, has become widespread in recent years. Examples of communication protocols used in case of direct printing include PictBridge, IrDA and Bluetooth, etc. With direct printing, at first it was possible to print only photographic data or specific-format data typified by vCard and vCalendar. Now, however, it is possible to print based upon methods defined by the Basic Printing Profile (referred to as "BPP" below) of Bluetooth. As a result, devices that exchange data in the XHTML-Print format handled at the same time as documents and photographs have appeared on the market.

The BPP communication protocol defines various methods through which a printer responds to a mobile device with its status, as well as a variety of examples of status capable of serving as responses. However, what has been defined as such answerable status is limited to the most general. For example, although status to the effect that a printer has run out of ink has been defined, information as to the color of the ink that has run out has not been defined. With this method, therefore, it is not possible to add on various status information, and vendors are prohibited from defining their own originally defined status and adding it to the protocol. Furthermore, a field in which a vendor's own original information can be described also has not been defined. This makes it impossible for a vendor to add on desired features.

A technique for exchanging original information by using a communication protocol in which exchange of such originally defined information has not been defined has been proposed in Japanese Patent Application Laid-Open No. 2004-303194. According to this technique, if an extended function exists in the protocol of a direct printing system (DPS), notification of the extended function is given beforehand when capability information is acquired. When a DPS function is subsequently executed, a tag relating to the extended function is added to the tag of the DPS function defined in XML, and a designation relating to the additional function is made. Besides a technical solution, there is a solution based upon a method in which an agreement relating to information to be newly added on and the method of acquiring this information is made between vendors who implement a BPP connection, and communication is then performed in accordance with this agreement.

According to the BPP communication protocol, the describing of a certain type of information in a specific field of OBEX, which is a protocol of a lower level of BPP, is the only method that is allowed as a method of exchanging such original information. However, the field has been defined only for data that is text-format data; the description can be made freely in terms of the purpose thereof, when it was made and what the content is. Accordingly, there is the danger that content described by a certain vendor will be interpreted completely differently by the device of another vendor. For example, there is concern that described content will be displayed as is to user or, in a worst-case scenario, that a problem will occur at the time of a connection, e.g., disconnect or hang-up, owing to analysis failure. Consequently, it may be difficult for the header to be used by the vendor itself and the state of affairs is such that printer status defined by the vendor itself using the header cannot be sent back as a response.

Although it is possible to solve this problem by a method in which an agreement is reached between vendors that implement a BPP connection, this method requires a great deal of time for the agreement itself. Further, there is the likelihood that problems will arise in a case where the device of the other party is the device of a vendor that is not participating in the agreement, or in a case where the device of the other party is one that was a participant before the agreement was reached. Often the agreement employs a method in which negotiation for verifying each other's capabilities is performed at the time of connection. However, if such new negotiations are provided, there is the danger that the very data for the negotiation will cause problems in a case where the other party's device does not know of the data.

Further, according to the method set forth in Japanese Patent Application Laid-Open No. 2004-303194 cited above, notification of information concerning extended functions is given when capability information is acquired. With BPP at the present time, however, means for notifying of such information relating to extended functions do not exist. If a specific field of OBEX is used in order to notify of this information, there is the danger that a problem will arise that is similar to that when notification of status information is given. Accordingly, since notification relating to extended functions cannot be given in advance, the method disclosed in Japanese Patent Application Laid-Open No. 2004-303194 cannot be employed. Furthermore, a method of specifying an extended function by adding on an XML tag indicated in Japanese Patent Application Laid-Open No. 2004-303194 is such that in communication with an unspecified party whose ability to analyze XML is unknown, assurance as to how the device of the other party will operate cannot be obtained. For example, with XML, in order to avoid confusion in which elements or attributes having the same name are defined by different meanings, a name space is utilized. If processing is not executed upon detecting the range over which the name space extends, a mistake will occur in interpretation. In addition, the ability of a parser that interprets and processes XML is not only that set forth in the specifications of W3C, and some parsers have their functions limited to the minimum necessary. Consequently, XML will not necessarily be interpreted as expected.

SUMMARY OF THE INVENTION

The present invention solves the foregoing problems encountered in the prior art.

According to a feature of the present invention, after a communication apparatus and a printing apparatus have confirmed that each other is capable of processing a structured language, the communication method is declared using data described in the structured language. As a result, there is no danger that a problem will be caused in the device of another party even in subsequent communication, and it is also possible to set a new communication method.

According to the present invention, there is provided a printing system comprising a communication terminal for supplying print data to a printing apparatus, and a printing apparatus for receiving and printing the print data, wherein the communication terminal includes:

a declaration unit, in a case where the communication terminal has an analyzing unit for analyzing information described in a structured language, configured to declare to the printing apparatus that the information is capable of being analyzed;

a transmission unit, in a case where the printing apparatus is capable of analyzing the information described in the structured language, configured to transmit description data, which relates to a communication method described in the structured language, to the printing apparatus; and a communication control unit configured to communicate with the printing apparatus in accordance with the communication method described by the description data; and the printing apparatus includes:

a unit, in a case where the printing apparatus has an analyzing unit for analyzing information described in structured language, configured to declare to the communication terminal that the information is capable of being analyzed;

an interpretation unit configured to interpret description data relating to a communication method described in the structured language transmitted from the communication terminal; and a print communication control unit configured to communicate with the communication terminal in accordance with the communication method described by the description data.

Further, according to the present invention, there is provided a communication apparatus comprising:

an analyzing unit configured to analyze information described in a structured language;

a unit configured to declare to another party's device the fact that the communication apparatus has the analyzing unit;

a transmission unit, in a case where the other party's device is capable of analyzing the information described in the structured language, configured to transmit description data, which relates to a communication method described in the structured language, to the other party's device; and a communication control unit configured to communicate with the other party's device in accordance with the communication method described by the description data.

Further, according to the present invention, there is provided a printing apparatus comprising:

an analyzing unit configured to analyze information described in a structured language;

a unit configured to declare to a communication terminal the fact that the printing apparatus has the analyzing unit;

an interpretation unit configured to interpret description data relating to a communication method described in the structured language transmitted from the communication terminal;

a print communication control unit configured to communicate with the communication terminal in accordance with the communication method described by the description data; and a print control unit configured to print based upon print data communicated by the print communication control unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram useful in describing the configuration of a printing system according to an embodiment of the present invention;

FIG. 3 depicts a view illustrating an example of a 1284 ID that includes key information sent back as a response by a printer according to this embodiment;

FIG. 4 depicts a view illustrating an example of a declaration of a Description header and an ACK response that complies with use of Description header described in the XML format according to this embodiment;

FIG. 7 depicts a view illustrating an example of an originally defined status sent back as a response by a printer according to this embodiment;

FIG. 9 is a diagram illustrating an example of a description in which an originally defined status has been added onto a SOAP response using XML data in this embodiment;

DESCRIPTION OF THE EMBODIMENT

Figure 2:
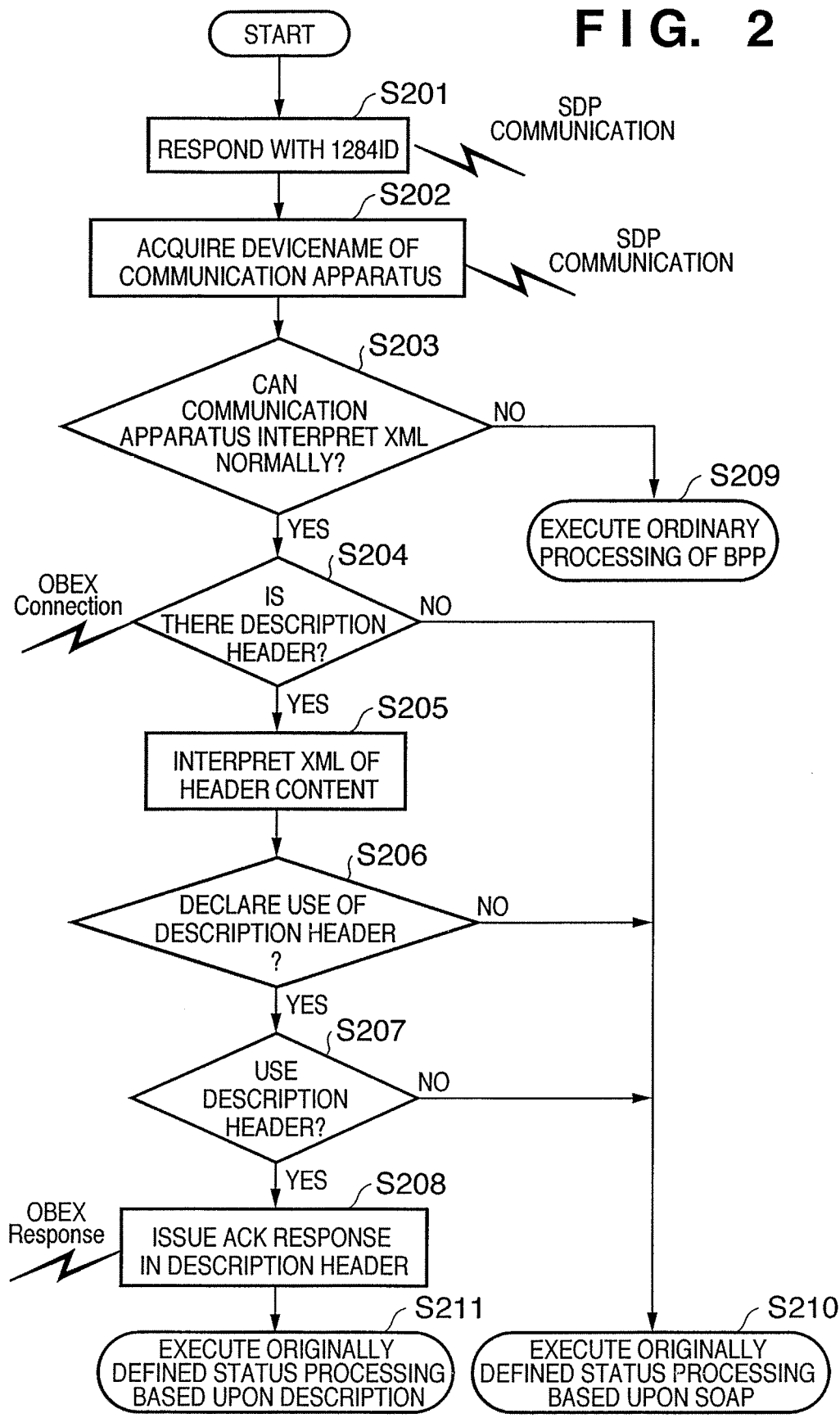
FIG. 2 is a flowchart useful in describing processing in a printer according to this embodiment.

A preferred embodiment of the present invention will now be described in detail with reference to the accompanying drawings. It should be noted that the embodiments below do not limit the present invention set forth in the claims and that not all of the combinations of features described in the embodiments are necessarily essential as means for attaining the objects of the invention.

[First Embodiment]

FIG. 1 is a block diagram useful in describing the configuration of a printing system according to an embodiment of the present invention. This system includes a printer 101 and a communication apparatus 110 that are connected wirelessly.

The printer 101 has a printer controller 106, which includes a printer engine, for executing print processing; a CPU 102 for controlling operation of the overall printer 101 in accordance with a control program that has been stored in a ROM 104; a RAM 105, which is used as a work area when control processing is executed by the CPU 102, for storing various data temporarily; a wireless communication interface controller 103 for controlling communication by Bluetooth; a baseband unit 107; an RF unit 108 and an antenna 109.

When data is transmitted from the printer 101 to the device of another party, the transmit data is transferred from the wireless communication interface controller 103 to the baseband unit 107 in accordance with a scheme that has been defined by the Bluetooth specification. The data is modulated by the baseband unit 107 and transmitted to another wireless communication device by the antenna 108. When data is received, on the other hand, the data is transferred on a path that is the reverse of that in the case of transmission.

Similarly, the communication apparatus 110 also has a CPU 111, wireless communication interface controller 114, ROM 112, RAM 113, baseband unit 115, RF unit 116 and antenna 117. The communication apparatus 110 is connected to the printer 101 by Bluetooth communication and causes the printer 101 to print by sending and receiving various print data and control data. The communication apparatus 110 is equipped with a display unit (not shown) and is capable of presenting a variety of displays.

The printer 101, which is capable of performing communication defined by the Basic Printing Profile (BPP) of the Bluetooth communication specification, sends and receives data and prints accordingly. Similarly, the communication apparatus 110 also is capable of transmitting print data to the printer 101 by performing communication in accordance with the scheme defined by the BPP, and can thereby instruct the printer 101 to print.

Reference will now be had to the flowchart of FIG. 2 to describe the details of operation when the printer 101 accepts a connection for BPP communication from the communication apparatus 110.

FIG. 2 is a flowchart for describing processing in the printer 101 according to this embodiment. The program for executing this processing has been stored in ROM 104 and is executed under the control of the CPU 102.

This processing is started by receiving service search communication (referred to as "SDP" below) defined by the Bluetooth communication specification before connection by the BPP. First, at step S201, the printer 101 responds to the SDP search, which has been received from the communication apparatus 110, with 1284ID information defined by the BPP. The 1284ID in the response includes key information indicating that the printer 101 is capable of processing XML. The key information indicates that the printer 101 is capable of processing a name space defined by the XML specification and, if XML information was contained in various headers or fields for which a format has not been particularly defined, indicates that processing based upon XML is possible.

FIG. 3 depicts a view illustrating an example of 1284ID that includes key information sent back as a response by the printer 101 according to this embodiment. The fact that XML is capable of being processed has been described.

Here the fact that the XML description is capable of being interpreted is declared by "EXT: XML10".

Next, at step S202, the printer 101 tries to search the communication apparatus 110, which is the other party's device, for DeviceName, which is an SDP attribute determined in advance. If acquisition of DeviceName succeeds, control proceeds to step S203. Here it is determined whether Device-Name contains information indicating that the communication apparatus 110 is capable of processing XML. This information indicates that the communication apparatus 110 is capable of processing a name space defined by the XML specification and, if XML information was contained in various headers or fields for which a format has not been particularly defined, indicates that the XML information is capable of being interpreted. If it is determined at step S203 that this information is not contained in DeviceName, then control proceeds to step S209. Here the printer 101 interprets the fact that processing of an XML description such as a name space is not possible by the communication apparatus 110 and executes subsequent status processing to the extent defined by ordinary BPP.

According to this embodiment, 1284ID or DeviceName is used in order to indicate that an XML description is capable of being interpreted. However, another predetermined SDP attribute or information that is attendant upon Bluetooth communication may be employed.

If it is found at step S203 that the information is contained in DeviceName, control proceeds to step S204. Here the printer determines whether the packet, which is sent next, of an OBEX connection for BPP contains a Description header (DescriptionHeader). If the packet of the OBEX connection does not contain a Description header, then the printer 101 determines that the communication apparatus 110 will not perform extended communication that uses a specific header or field. Control then proceeds to step S210, where the printer performs a subsequent originally defined status response utilizing a SOAP response defined by the BPP.

If the printer 101 determines at step S204 that the packet of the OBEX connection does contain a Description header, then control proceeds to step S205. Here the printer 101 checks to determine whether the data contained in the Description header is described in XML. If the data is data described in XML, the printer 101 analyzes the content thereof. The processing for analyzing the content of the Description header is an operation in conformity with the fact that 1284ID indicates that the data described in XML is capable of being processed. Thus, the fact that data described in XML can be analyzed is indicated by 1284ID and is assured. As a result, even if there is an XML description in a header, it is assured that abnormal processing, which is ascribable to the fact that this cannot be interpreted, will not occur.

Next, as a result of the analysis of the Description header at step S205, it is determined at step S206 whether it could be verified that this is a declaration that the Description header will be used in subsequent extended communication. If this could not be verified, then control proceeds to step S210 and the printer 101 so arranges it that in a subsequent originally defined status response, the response will be made utilizing a SOAP response defined by the BPP. It should be noted that when the data described in XML is analyzed, a similar result is obtained also in a case where the meaning of a tag indicating extended use of a specific field or header, described later, could not be understood. Such a case occurs, even if the printer 101 is capable of interpreting the data described in XML, in instances where the name space specified by the data described in XML cannot be recognized. However, since the fact that the name space cannot be recognized is determined correctly as a result of the analysis processing, it is assured that unexpected problems, such as abnormal processing due to the fact that a tag cannot be recognized, will not occur.

On the other hand, if could verified at step S206 that the content is a declaration that the Description header will be used in subsequent extended communication, then control proceeds to step S207. Here the printer 101 determines whether the Description header will be used in subsequent extended communication in accordance with its own communication capability. If the printer 101 determines that the extended communication will not be carried out or that the Description header will not be used, then control proceeds to step S210. Here the printer 101 so arranges it that in a subsequent originally defined status response, the response will be made utilizing a SOAP response defined by the BPP.

If it is determined at step S207 that the Description header will be used in the extended communication, control proceeds to step S208. Here the printer 101 appends the Description header to the response packet of the OBEX connection and sends back an ACK response, which complies with use of the Description header, to the communication apparatus 110 in the XML format. Control then proceeds to step S211, where the printer 101 so arranges it that in a subsequent originally defined status response, the response will be made utilizing the Description header.

FIG. 4 depicts a view illustrating an example of a declaration of a Description header and an ACK response that complies with use of the Description header described in the XML format according to this embodiment.

In FIG. 4, use of the Description header is declared by "OBEX: Description:05" 400. In the ACK response to this, the ACK response is made by "ACK:00" contained in <bt-ext:UsedHeaderResponse> in FIG. 4.

In this embodiment, the OBEX Description header is used in order to declare header use. However, another predetermined header, etc., may be employed. Although a Description header is likewise used in order to perform subsequent extended communication, here also another predetermined header may be employed.

In the explanation given above, the description is rendered on the assumption that the printer 101 will perform an originally defined status response. However, in a case where an originally defined status response is not made, the fact that XML description data is capable of being processed is not indicated in 1284ID sent back as the response. Even if it is indicated, it will suffice to so arrange it that the subsequent status processing will be executed within the limits defined by ordinary BPP.

Figure 5:
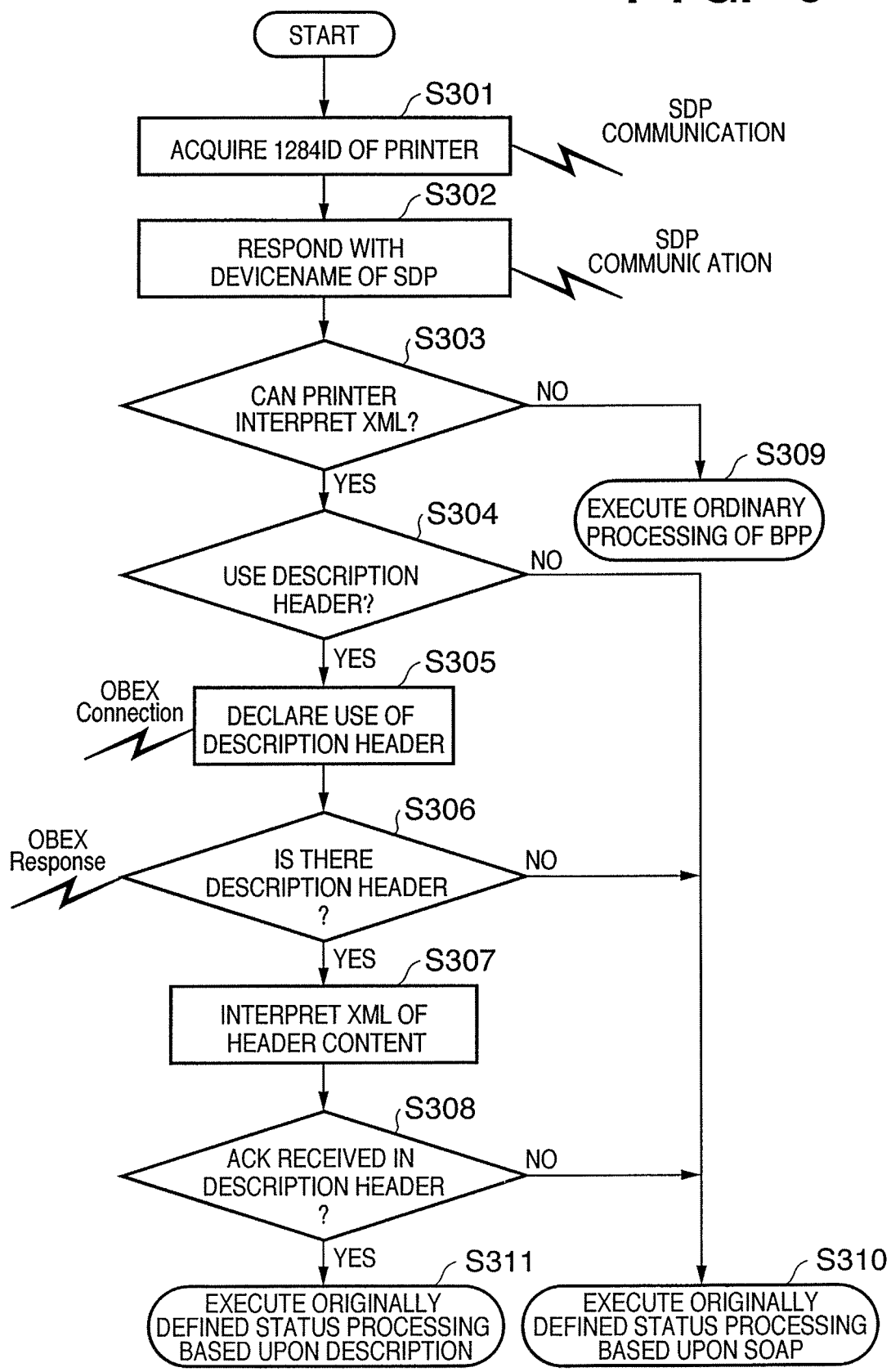
FIG. 5 is a flowchart useful in describing connection processing for BPP communication in the communication apparatus of a printing system according to this embodiment.

FIG. 5 is a flowchart useful in describing connection processing for BPP communication in the communication apparatus 110 of the printing system according to this embodiment. The program for executing this processing has been stored in the ROM 112 and is executed under the control of the CPU 111.

First, at step S301, the communication apparatus 110 subjects the printer 101 to an SDP search of 1284ID information, which has been defined by the BPP, before the BPP connection is made. If there is a retrieval of DeviceName, which is a predetermined SDP attribute, from the printer 101, then the communication apparatus 110 inserts information, which indicates that the apparatus 110 is capable of processing data described in XML, in DeviceName and sends this back as a response to the printer 101 at step S302.

An example of DeviceName containing information indicating that the communication apparatus 110 is capable of processing the data described in XML sent back as a response is as illustrated in FIG. 3 described above.

Next, at step S303, the communication apparatus 110 determines whether the acquired 1284 ID contains key information indicating that processing based upon XML is possible by the printer 101. If the key information is not contained, control proceeds to step S309, where the apparatus so arranges it that subsequent status processing is executed to the extend defined in ordinary BPP.

On the other hand, if it is found at step S303 that the acquired 1284 ID contains key information indicating the interpretation of an XML description is possible, then control proceeds to step S304. Here the apparatus 110 determines whether the Description header will be used in the subsequent extended communication in accordance with its own communication capability. If the apparatus 110 determines that the Description header will not be used in subsequent extended communication, then control proceeds to step S310. Here the apparatus 110 executes processing so as to enable the acquisition of an originally defined status response that utilizes the SOAP response from the printer 101. Although the communication apparatus 110 does not perform an extension that makes extended use of a field or header, it is in a state in which XML description language is capable of being interpreted. Accordingly, even if the printer 101 has appended originally defined status information utilizing a name space that the communication apparatus 110 does not know, the operation performed is one in which this is merely read and discarded. Accordingly, the operation performed is one which assures that unexpected problems, such as abnormal processing due to the fact that a tag cannot be recognized, will not occur.

If it is determined at step S304 that the Description header will be used in subsequent extended communication, then control proceeds to step S305. Here the communication apparatus 110 appends the Description header to the ensuing packet of the OBEX connection for BPP, describes a declaration, in the XML format, that the Description header will be used in the subsequent extended communication and transmits this to the printer 101.

An example of a declaration of extended use of a Description header described in the XML format is as illustrated in FIG. 4 described above.

Even if the printer 101 cannot comprehend the name space of "bt-ext" shown in FIG. 4, the information contained in the tag used in this name space is read and discarded in accordance with processing of data described in XML declared by 1284ID. Stable operation is therefore assured.

Next, at step S306, the communication apparatus 110 determines whether the Description header is contained in the response packet to the subsequent OBEX connection and checks to determine whether the data contained in the Description header has been described by XML. If this is not the case, control proceeds to step S310. However, if the data is data described in XML, then control proceeds to step S307 and the apparatus analyzes the content of the data described in XML. Next, at step S308, the apparatus 110 determines whether this data is an ACK response that complies with use of the Description header described in the XML format (see FIG. 4). If it is not, control proceeds to step S310. Here the apparatus 110 executes processing so as to enable the acquisition of an originally defined status response that utilizes the SOAP response from the printer 101.

On the other hand, if it is found at step S308 the data is an ACK response that complies with use of the Description header, then control proceeds to step S311. Here the apparatus 110 executes processing so as to enable the acquisition of an originally defined status response utilizing the subsequent Description header. Here the communication apparatus 110 is in a state in which it can interpret the data described in XML making extended use of the Description header. Accordingly, even if the printer 101 has appended and transmitted originally defined status information utilizing a name space that the communication apparatus 110 does not know, the operation performed is one in which this portion is merely read and discarded. Thus it is assured that abnormal processing or the like will not occur.

By executing processing through the procedure described above, even in a case where the communication apparatus 110 cannot handle a specific header, the printer 101 transmits the originally defined status to the communication apparatus 110, thereby making it possible to exclude the possibility that the communication apparatus 110 will give rise to abnormal operation.

Similarly, even in a case where the printer 101 cannot handle a specific header, the possibility that a negotiation packet transmitted from the communication apparatus 110 to the printer 101 will give rise to abnormal operation of the printer can be excluded.

Thus, in accordance with the printing system of this embodiment, stable negotiation is possible between a printer and a communication apparatus that do not know each other's processing capability. Further, it is possible for originally defined status to be exchanged stably.

Furthermore, this processing procedure predetermines only the expression of processing of an XML description based upon SDP, and the header used at the time of the connection. Accordingly, an advantage is that communication having a high degree of extendibility can be performed stably. A further advantage is that even if devices communicating with each other are not equipped with this function simultaneously, the function may be installed in order starting from the device that employs this procedure.

Figure 6:
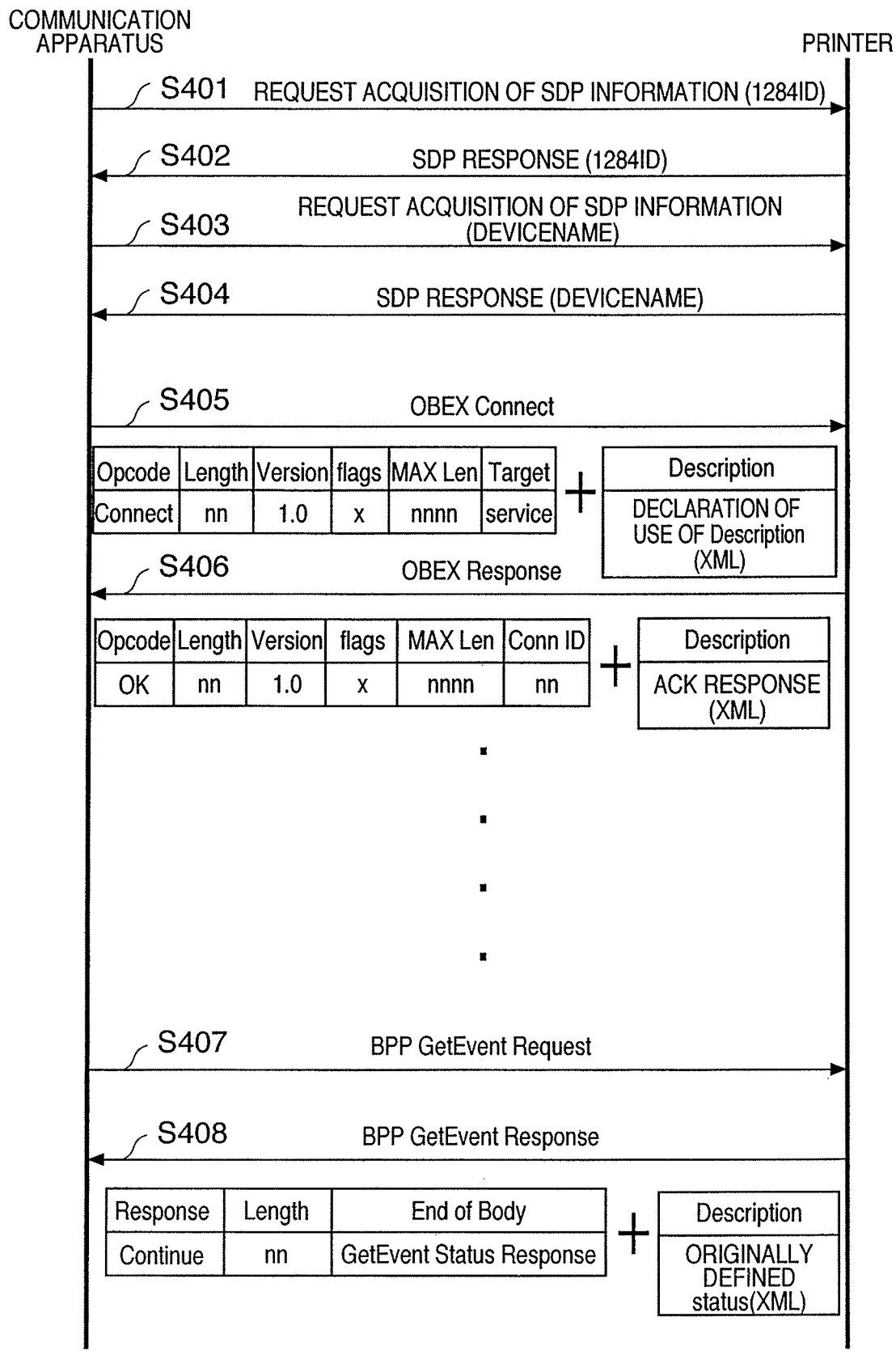
FIG. 6 is a diagram useful in describing an example of operation when an originally defined status is sent back as a response while a printer and a communication apparatus are performing BPP communication.

FIG. 6 is a diagram useful in describing an example of operation when an originally defined status is sent back as a response while the printer 101 and communication apparatus 110 are performing BPP communication.

FIG. 6 illustrates the flow of operation when the printer 101 and communication apparatus 110 perform a status response by GetEvent stipulated by JobBasedModel of the BPP. FIG. 6 also illustrates the state of a packet when an originally defined status response is made by making extended use of the Description header in accordance with the flowchart set forth above.

The printer 101 and communication apparatus 110 execute operations indicated at steps S401 to S404 in FIG. 6 in accordance with the above-described flowchart and check to determine whether each other can process data described in XML. If the communication apparatus 110 confirms that the printer 101 is capable of processing data described in XML, then Description header is appended to the ensuing packet of the OBEX connection for BPP and a declaration of use of the Description header described in XML is inserted, as indicated at S405. In response, the printer 101 appends Description header to the response packet of the OBEX connection and inserts an ACK response described in XML, as indicated at S406.

A GetEvent request from the communication apparatus 110 is thenceforth transmitted to the printer 101 at S407. If an originally defined status exists at this time, then the printer 101 appends Description header to the ordinary GetEvent response packet, inserts the originally defined status described in XML and sends the response, as indicated at S408. An example of content of originally defined status described in XML is not only status not given as a response in GetEvent but also content equivalent to status given as a response in GetEvent. Thus, the printer is capable of appending originally defined status and responding to a GetEvent request from the communication apparatus 110.

FIG. 7 depicts a view illustrating an example of an originally defined status sent back as a response by the printer 101 according to this embodiment.

If the communication apparatus 110 can comprehend the name space "ganon-IJ" or "iPXX" contained in this originally defined status and can interpret the content thereof, then the communication apparatus 110 is capable of acquiring the originally defined status of the printer 101. In FIG. 7, the fact that cyan ink of an ink-jet printer is empty is indicated at 700, and the fact that the status of iPXX is "C=5" is indicated by 701. Even in a case where the communication apparatus 110 is incapable of comprehending the name space "ganon-IJ" or "iPXX" in FIG. 7, the information contained in the tag used in the name space is read and discarded in accordance with XML processing declared by ServiceName. Stable operation is therefore assured.

Figure 8:
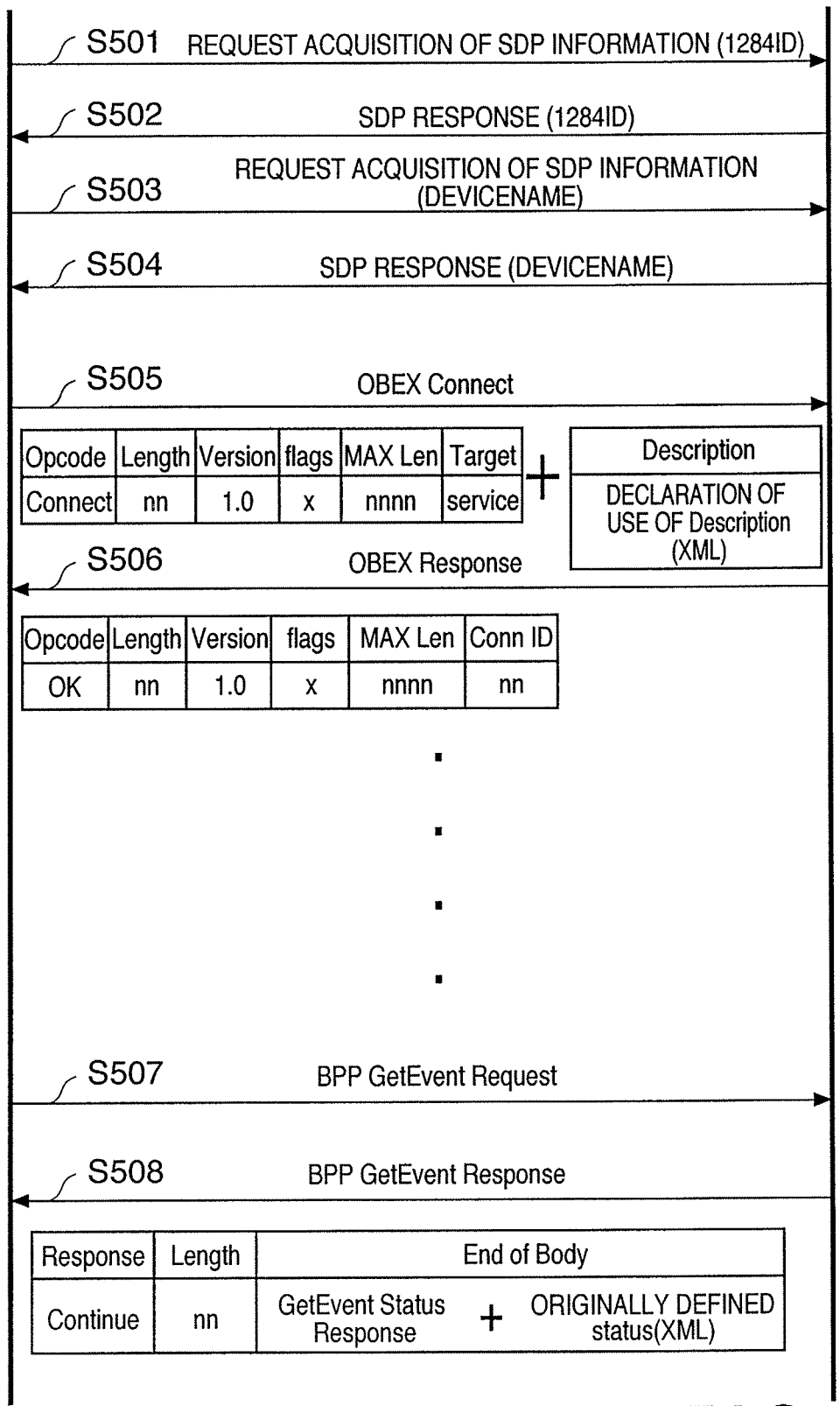
FIG. 8 is a diagram useful in describing another example of operation when an originally defined status is sent back as a response while a printer and a communication apparatus are performing BPP communication.

FIG. 8 is a diagram useful in describing another example of operation when an originally defined status is sent back as a response while the printer 101 and communication apparatus 110 are performing BPP communication.

FIG. 8 illustrates the flow of operation when the printer 101 and communication apparatus 110 perform a status response by GetEvent stipulated by JobBasedModel of BPP. Unlike FIG. 6, FIG. 8 illustrates the state of a packet when an originally defined status response is made by utilizing the SOAP response.

The printer 101 and communication apparatus 110 execute operations indicated at steps S501 to S504 in accordance with the above-described flowchart and check to determine whether each other can process data described in XML. If the communication apparatus 110 confirms that the printer 101 is capable of processing data described in XML, then Description header is appended to the ensuing packet of the OBEX connection for BPP and a declaration of use of the Description header described in XML is inserted, as indicated at S505. In a case where the printer 101 refuses use of the Description header, it responds without appending Description header to the response packet of the OBEX connection, as indicated at S506.

A GetEvent request from the communication apparatus 110 is thenceforth transmitted to the printer 101 at S507. If an originally defined status exists at this time, then the printer 101 inserts originally defined status, described by extending the name space in XML, to the SOAP response portion of the usual GetEvent and issues the response, as indicated at S508. An example of content of originally defined status described in XML is not only status not given as a response in GetEvent but also content equivalent to status given as a response in GetEvent. Thus, the printer 101 is capable of appending originally defined status and responding to a GetEvent request from the communication apparatus 110.

FIG. 9 depicts a view illustrating an example of a description in which an originally defined status has been added onto a SOAP response using XML data in this embodiment.

In FIG. 9, reference numeral 900 denotes a response portion based upon originally defined status. If the communication apparatus 110 can comprehend the name space "ganon-IJ" or "iPXX" illustrated in FIG. 9, and can interpret the content thereof, then the communication apparatus 110 is capable of acquiring the originally defined status of the printer 101. Even in a case where the communication apparatus 110 is incapable of comprehending the name space "ganon-IJ" or "iPXX" illustrated in FIG. 9, the information contained in the tag used in the name space is read and discarded in accordance with XML processing declared by ServiceName. Stable operation is therefore assured.

Figure 10:
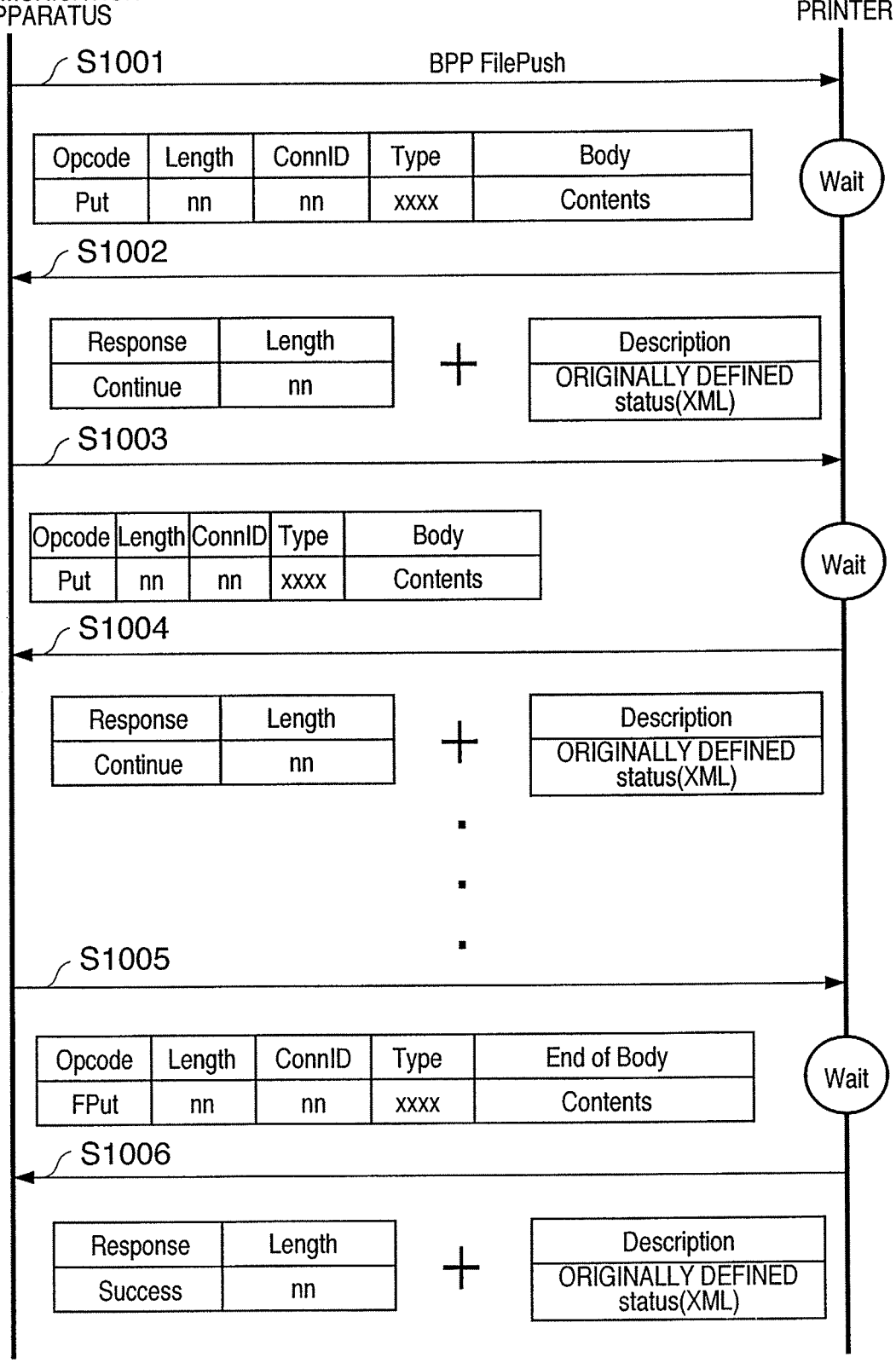
FIG. 10 depicts a view useful in describing a further example of operation when an originally defined status is sent back as a response while a printer and a communication apparatus are performing BPP communication.

FIG. 10 is a diagram useful in describing a further example of operation when an originally defined status is sent back as a response while the printer 101 and communication apparatus 110 are performing BPP communication. Here FIG. 10 illustrates operation when the printer 101 and communication apparatus 110 send back an originally defined status response (S1002, S1004, S1006) in response to FilePush (S1001, S1003, S1005) stipulated by SimplePushModel of BPP. Further, FIG. 10 illustrates, on a per-packet basis, OBEX communication when the communication apparatus 110 performs FilePush.

It is assumed here that the printer 101 and communication apparatus 110 confirm processing of XML and confirm use of Description header in accordance with the foregoing flowchart. With this SimplePushModel, SOAP communication is not carried out. Therefore, even in a case where the state is one in which Description header is not used, an originally defined status response is not made and only ordinary BPP processing is executed. At S1002, S1004, S1006 in FIG. 10, an example when an originally defined status response is made using Description header is illustrated.

According to FilePush of the SimplePushModel, if the file size of print data is equal to or greater than the MAX packet size of OBEX, then the data is divided into several packets and is transmitted by PUT several times, as indicated at S1001, S1003, S1005. As illustrated in FIG. 10, Description header is appended to the packet of Continue or Success response with respect to each PUT, the originally defined status described in XML is inserted and the response is issued.

In a case where the printer 101 has made a Continue or Success response immediately in response to each PUT transmission of OBEX, there is a high likelihood that receipt of the print data will end before printing starts or at an early stage of printing. Accordingly, an opportunity for status of the printer 101 to be sent back as a response is limited to a time prior to start of printing or to an early stage of printing. In order to avoid such a condition, this embodiment inserts waiting time (Wait) before each Continue or Success response is returned, as illustrated in FIG. 10. By inserting such waiting time, an opportunity to return the status response can be made to wait until just before printing or until printing ends.

Figure 11:
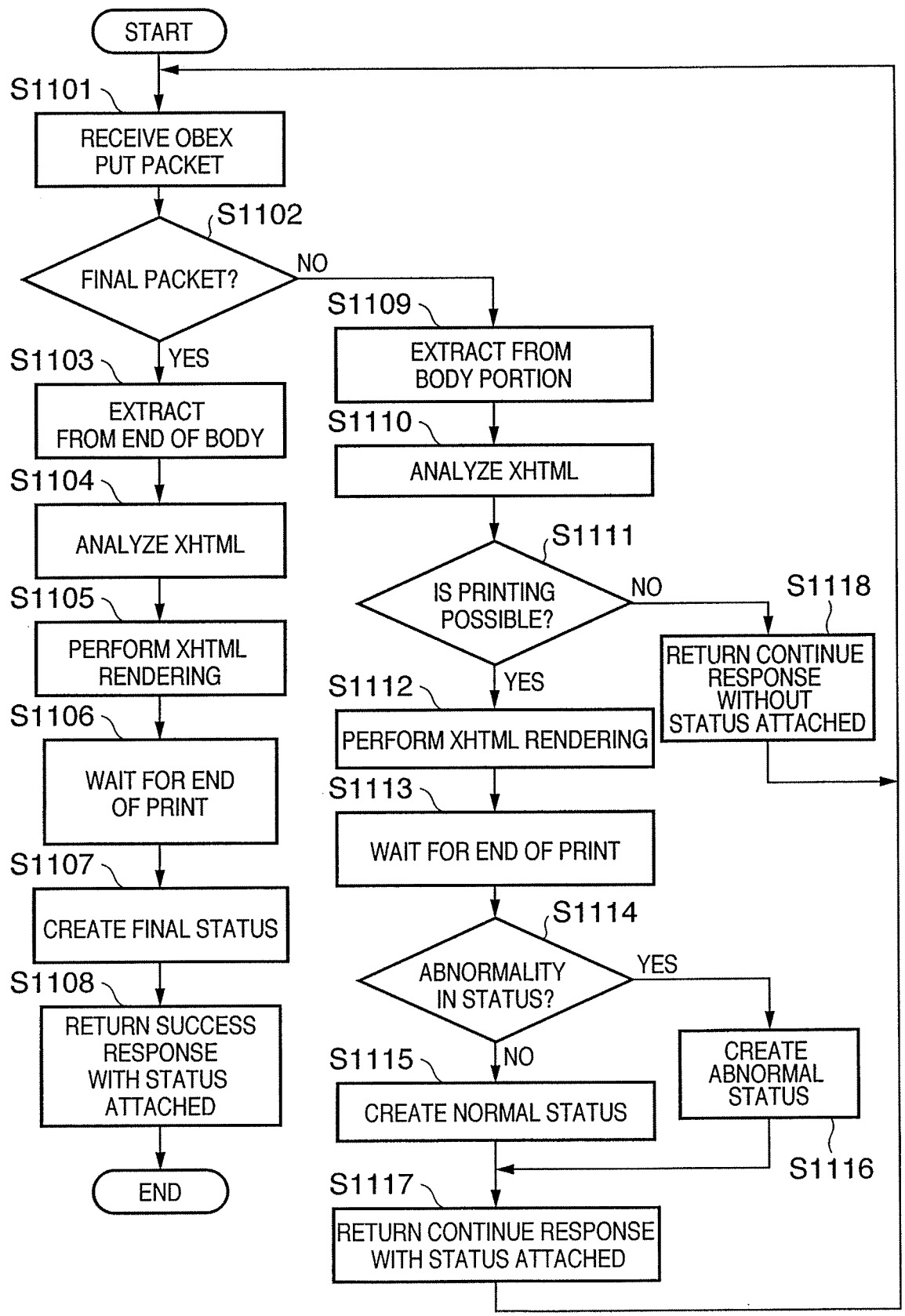
FIG. 11 is a flowchart useful in describing processing relating to a wait operation when a printer sends back a continue or success response in this embodiment.

FIG. 11 is a flowchart useful in describing processing relating to a wait operation when the printer 101 sends back a continue or success response in this embodiment. The program for executing this processing has been stored in the ROM 104 and is executed under the control of the CPU 102. In a manner similar to that of FIG. 10, FIG. 11 also illustrates the flow of processing when the printer 101 returns the originally defined status response based upon the Description header in SimplePushModel. Further, it is assumed that print data in the XHTML format is received and printed as the print data.

First, at step S1101, the printer 101 receives a PUT packet of OBEX, whereupon control proceeds to step S1102. Here the printer 101 determines whether the packet is the final packet. Whether the packet is the final packet or not can be checked by a specific bit defined by the OBEX communication specification. If it is determined that the packet is the final packet, control proceeds to step S1103, where the printer 101 extracts the final packet of print data from the End of Body portion. Next, at step S1104, the printer 101 performs XHTML analysis of the final print data extracted. Then, at step S1105, the printer 101 renders and prints the XHTML data. The printer 101 waits for end of printing at step S1106. When printing ends, the status of printer 101 that is returned in the final response is created at step S1107. Control then proceeds to step S1108, at which this status is appended to the Description header and a success response is made.

On the other hand, if the PUT packet received at step S1101 is not the final packet, control proceeds to step S1109. Here the printer 101 extracts an interim packet of the print data from the Body portion thereof and then analyzes the XHTML data at step S1110. As a result of analysis of the XHTML data, it is determined whether this is a case where the received data cannot be printed because it is only a header, for example. If the data cannot be printed, control proceeds to step S1118. Here the ordinary Continue response is made without appending the status of the printer 101, and the printer 101 prepares for receipt of the next PUT packet.

If it is determined at step S1111 that printing is possible to the extent of the received data, then control proceeds to step S1112, where the printer 101 renders and prints the XHTML data. Next, at step S1113, the printer 101 waits for end of printing. Then, at step S1114, the printer 101 determines whether printing could be performed normally without a change in the status of the printer 101 unit the end of printing. In case of normal printing, control proceeds to step S1115.

Here the printer 101 creates normal status, appends this to the Description header and returns the Continue response. Control then proceeds to step S1117. On the other hand, if some abnormality or a change in status of the printer 101 occurs during printing at step S1114, then control proceeds to step S1116, where the printer 101 creates its status. Control then proceeds to step S1117, at which the printer 101 appends the status to the Description header and performs the Continue response. The printer 101 then prepares for the receipt of the next PUT packet.

In accordance with this embodiment, as described above, after confirming the printing of data in the amount received, the printer 101 returns the status response. As a result, an opportunity to return the status response can be made to wait until just before printing or until printing ends.

(Other Embodiments)

Although an embodiment of the present invention has been described in detail, the present invention may be applied to a system constituted by a plurality of devices or to an apparatus comprising a single device.

Furthermore, there are cases where the object of the invention is attained also by supplying a software program, which implements the functions of the foregoing embodiment, directly or remotely to a system or apparatus, reading the supplied program with a computer of the system or apparatus, and then executing the program. In this case, so long as the system or apparatus has the functions of the program, the mode of implementation need not rely upon a program.

Accordingly, since the functional processing of the present invention is implemented by computer, the program codes per se installed in the computer also implement the present invention. In other words, the present invention also covers a computer program that is for the purpose of implementing the functional processing of the present invention. In this case, so long as the system or apparatus has the functions of the program, the form of the program, e.g., object code, a program executed by an interpreter or script data supplied to an operating system, etc., does not matter.

Examples of recording media for supplying the program are a floppy (registered trademark) disk, hard disk, optical disk, magneto-optical disk, CD-ROM, CD-R, CD-RW, magnetic tape, non-volatile type memory card, ROM, DVD (DVD-ROM, DVD-R), etc.

As for the method of supplying the program, the program can also be supplied by being downloaded to a recording medium such as a hard disk from a website on the Internet using a browser possessed by a client computer. In such case, what is downloaded is the computer program per se of the present invention or an automatically installable compressed file. Further, the program of the present invention can be supplied by dividing the program code constituting the program into a plurality of files and downloading the files from different websites. In other words, there are cases where a WWW server that downloads, to multiple users, the program files that implement the functions and processes of the present invention by computer also is covered by the present invention.

Further, it is also possible to encrypt and store the program of the present invention on a storage medium such as a CD-ROM and distribute the storage medium to users. In this case, users who meet certain requirements are allowed to download decryption key information from a website via the Internet, and the program decrypted using this key information is installed on a computer in executable form.

Further, implementation of the functions is possible also in a form other than one in which the functions of the foregoing embodiment are implemented by having a computer execute a program that has been read. For example, based upon indications in the program, an operating system or the like running on the computer may perform all or a part of the actual processing so that the functions of the foregoing embodiments can be implemented by this processing.

Furthermore, it may be so arranged that a program that has been read from a recording medium is written to a memory provided on a function expansion board inserted into the computer or provided in a function expansion unit connected to the computer. In this case, a CPU or the like provided on the function expansion board or function expansion unit performs some or all of the actual processing based upon the indications in the program and the functions of the foregoing embodiments are implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-000789, filed Jan. 5, 2006, which is hereby incorporated by reference herein in its entirety.

What is claimed is:

1. A printing system comprising a communication apparatus and a printing apparatus, the communication apparatus supplying print data to the printing apparatus, and the printing apparatus receiving and printing the print data, wherein the communication apparatus comprises:
a first communication unit configured to communicate with the printing apparatus using a profile for printing print data by communicating a message that is not described by a predetermined structured language;
a first declaration unit configured to declare to the printing apparatus that the communication apparatus is capable of interpreting information, in a case that a predetermined field of the message includes the information described using the predetermined structured language, wherein the predetermined field is a field which is not defined to be described using the predetermined structured language;
a first determination unit configured to determine whether the printing apparatus is able to interpret the information in a case that the predetermined field includes the information described using the predetermined structured language; and
a second determination unit configured to determine whether the printing apparatus communicates status information of the printing apparatus that is described in the predetermined field using the predetermined structured language, in a case that the first determination unit determines that the printing apparatus can interpret the information,
wherein the first communication unit communicates the status information of the printing apparatus that is described in the predetermined field using the predetermined structured language with the printing apparatus, in a case that the second determination unit determines that the printing apparatus communicates the status information, and
wherein the printing apparatus comprises:
a second communication unit configured to communicate with the communication apparatus using a profile for printing print data by communicating a message that is not described by the predetermined structured language;
a second declaration unit configured to declare to the communication apparatus that the printing apparatus is capable of interpreting information, in a case that a predetermined field of the message includes the information described using the predetermined structured language, wherein the predetermined field is a field which is not defined to be described using the predetermined structured language;
a third determination unit configured to determine whether the communication apparatus is capable of interpreting the information in a case that the information described using the predetermined structured language is included in the predetermined field; and
a fourth determination unit configured to determine whether the communication apparatus communicates status information of the printing apparatus that is described in the predetermined field, in a case that the third determination unit determines that the communication apparatus can interpret the information,
wherein the second communication unit communicates the status information of the printing apparatus that is described in the predetermined field using the predetermined structured language, in a case that the fourth determination unit determines that the communication apparatus communicates the status information.

2. The system according to claim 1, wherein the predetermined structured language is XML.

3. The system according to claim 1, wherein the communication apparatus and the printing apparatus communicate by Bluetooth communications.

4. The system according to claim 3, wherein the declaration is executed by communication of a service search defined by Bluetooth communication specifications.

5. The system according to claim 3, wherein the status information is communicated by a Description header of OBEX.

6. The system according to claim 1,
wherein first declaration unit and the second declaration unit declare using a message defined by a protocol different from the profile, and
wherein first determination unit and the third determination unit determine based on information included in the message defined by the protocol different from the profile.

7. The system according to claim 6, wherein the message defined by the protocol different from the profile is a message for establishing a communication session.

8. A communication apparatus comprising:
a communication unit configured to communicate with a printing apparatus using a profile for printing print data by communicating a message that is not described by a predetermined structured language;
a declaration unit configured to declare to the printing apparatus that the communication apparatus is capable of interpreting information, in a case that a predetermined field of the message includes the information described using the predetermined structured language, wherein the predetermined field is a field which is not defined to be described using the predetermined structured language;
a first determination unit configured to determine whether the printing apparatus is able to interpret the information in a case that the predetermined field includes the information described using the predetermined structured language; and
a second determination unit configured to determine whether the printing apparatus communicates status information of the printing apparatus that is described in the predetermined field using the predetermined structured language, in a case that the first determination unit determines that the printing apparatus can interpret the information, wherein the communication unit communicates the status information of the printing apparatus that is described in the predetermined field using the predetermined structured language with the printing apparatus, in a case that the second determination unit determines that the printing apparatus communicates the status information.

9. A printing apparatus comprising:
a communication unit configured to communicate with the communication apparatus using a profile for printing print data by communicating a message that is not described by a predetermined structured language;
a declaration unit configured to declare to a communication apparatus that the printing apparatus is capable of interpreting information in a case that a predetermined field of the message includes the information described using the predetermined structured language, wherein the predetermined field is a field which is not defined to be described using the predetermined structured language;
a first determination unit configured to determine whether the communication apparatus is capable of interpreting the information in a case that the information described using the predetermined structured language is included in the predetermined field; and
a second determination unit configured to determine whether the communication apparatus communicates status information of the printing apparatus that is described in the predetermined field using the predetermined structured language, in a case that the first determination unit determines that the communication apparatus can interpret the information,
wherein the communication unit communicates the status information of the printing apparatus that is described in the predetermined field using the predetermined structured language, in a case that the second determination unit determines that the communication apparatus communicates the status information.

10. A method of controlling a communication apparatus that transmits information described in a predetermined structured language to a printing apparatus and that causes the printing apparatus to print, the method comprising steps of:
communicating with a printing apparatus using a profile for printing print data by communicating a message that is not described by a predetermined structured language;
declaring to the printing apparatus that the communication apparatus is capable of interpreting information, in a case that a predetermined field of the message includes the information described using the predetermined structured language, wherein the predetermined field is a field which is not defined to be described using the predetermined structured language;
determining whether the printing apparatus is able to interpret the information in a case that the predetermined field includes the information described using the predetermined structured language; and
determining whether the printing apparatus communicates status information of the printing apparatus that is described in the predetermined field using the predetermined structured language, in a case that a determination is made that the printing apparatus can interpret the information,
wherein the communication apparatus communicates the status information of the printing apparatus that is described in the predetermined field using the predetermined structured language with the printing apparatus, in a case that a determination is made that the printing apparatus communicates the status information.

11. The method according to claim 10, wherein the communication apparatus and the printing apparatus communicate by Bluetooth communications.

12. The method according to claim 10, wherein the status information is transmitted by a Description header of OBEX.

13. A non-transitory computer-readable storage medium storing a program for causing a computer to perform the method of control set forth in claim 10.

14. A method of controlling a printing apparatus that receives and prints information described in a predetermined structured language from a communication apparatus, the method comprising steps of:
communicating with the communication apparatus using a profile for printing print data by communicating a message that is not described using a predetermined structured language;
declaring to the communication apparatus that the printing apparatus is capable of interpreting information, in a case that a predetermined field of the message includes the information described using the predetermined structured language, wherein the predetermined field is a field which is not defined to be described using the predetermined structured language;
determining whether the communication apparatus is capable of interpreting the information in a case that the information described using the predetermined structured language is included in the predetermined field; and
determining whether the communication apparatus communicates status information of the printing apparatus that is described in the predetermined field using the predetermined structured language, in a case that the communication apparatus is able to interpret the information,
wherein the printing apparatus communicates the status information of the printing apparatus that is described in the predetermined field using the predetermined structured language, in a case that a determination is made that the communication apparatus communicates the status information.

15. The method according to claim 14, wherein the communication apparatus and the printing apparatus communicate by Bluetooth communications.

16. The method according to claim 15, wherein the determining in the determining step is performed by communication of a service search defined by Bluetooth communication specifications.

17. The method according to claim 14, wherein the status information is transmitted by a Description header of OBEX.

18. A non-transitory computer-readable storage medium storing a program for causing a computer to perform the method set forth in claim 14.

19. The method according to claim 14,
wherein the printing apparatus notifies the communication apparatus of the status information in response to receiving a status request from the communication apparatus, when a connection request that does not include predetermined header information has been received from the communication apparatus, and
wherein the printing apparatus notifies the communication apparatus of the status information, without receiving the status request from the communication apparatus, when a connection request that includes the predetermined header information has been received from the communication apparatus.

\* \* \* \* \*